(12) United States Patent
Head

(10) Patent No.: US 7,673,588 B2
(45) Date of Patent: Mar. 9, 2010

(54) RETRACTABLE ROTATABLE PET TETHER

(76) Inventor: David T. Head, 101 Royals Ct., Trumbull, CT (US) 06611

( * ) Notice: Subject to any disclaimer, the term of this patent is extended or adjusted under 35 U.S.C. 154(b) by 142 days.

(21) Appl. No.: 11/528,013

(22) Filed: Sep. 27, 2006

(65) Prior Publication Data

US 2008/0072845 A1    Mar. 27, 2008

(51) Int. Cl.
*A01K 1/04* (2006.01)
(52) U.S. Cl. .................... 119/786; 135/118
(58) Field of Classification Search .......... 119/769, 119/784–791, 795–799; 242/375; D30/154; 135/118
See application file for complete search history.

(56) References Cited

U.S. PATENT DOCUMENTS

| 45,137 | A | 11/1864 | Clark |
|---|---|---|---|
| 172,868 | A | 2/1876 | Clough |
| 242,602 | A | 6/1881 | Clough |
| 304,299 | A | 9/1884 | Crabb |
| 337,309 | A | 3/1886 | Crabb |
| 814,834 | A | 3/1906 | Coughlin |
| 873,571 | A | 12/1907 | Mansfield |
| 1,990,289 | A | 2/1935 | Krueger |
| 2,437,786 | A | 3/1948 | Oberdorf et al. |
| 2,447,444 | A | 8/1948 | Waite |
| 3,088,438 | A | 5/1963 | Oliphant |
| 3,123,052 | A * | 3/1964 | Marshall ............ 119/789 |
| 4,796,566 | A | 1/1989 | Daniels |
| D308,282 | S | 6/1990 | Bergman et al. |
| 5,022,351 | A * | 6/1991 | Daniels ............ 119/789 |
| 5,031,486 | A | 7/1991 | Rydgren |
| D330,834 | S | 11/1992 | Hooper |
| 5,526,774 | A | 6/1996 | Swindall, Jr. et al. |
| D409,889 | S | 5/1999 | Kim |
| D445,318 | S | 7/2001 | Wellnitz |
| 6,523,500 | B1 | 2/2003 | Zenteno |
| D475,262 | S | 6/2003 | Hsieh |
| 6,810,630 | B2 | 11/2004 | Chizmas |
| 6,904,871 | B1 | 6/2005 | Archetti et al. |
| 2003/0066493 | A1 * | 4/2003 | Scheid et al. ............ 119/787 |
| 2005/0103282 | A1 * | 5/2005 | Huff et al. ............ 119/796 |
| 2005/0157967 | A1 * | 7/2005 | Ostling et al. ............ 384/537 |
| 2008/0000430 | A1 * | 1/2008 | Petersen ............ 119/786 |

* cited by examiner

*Primary Examiner*—Yvonne R. Abbott
(74) *Attorney, Agent, or Firm*—Lipsitz & McAllister, LLC

(57) ABSTRACT

A rotatable and retractable pet tether is disclosed. The pet tether has a spiral stake. A handle is attached to the spiral stake. A tether housing is rotatably mounted on the spiral stake. The tether housing has an opening therein. A tether line is disposed in the housing and adapted for deployment from the opening in the housing. A retraction mechanism is arranged in the housing for retracting the tether line after deployment. An attachment mechanism is connected to the tether line for attaching the tether line to a pet collar.

20 Claims, 4 Drawing Sheets

RETRACTABLE ROTATABLE PET TETHER

BACKGROUND

The present invention relates to the field of pet tethers. More specifically, the present invention provides a rotatable and retractable pet tether having a spiral stake.

When leaving a pet outside, in particular a dog, it is desirable for many reasons to be able to retain the pet within a certain area. For example, it may be desirable to restrain the pet in order to prevent the pet from leaving the owner's yard, to prevent injury to the pet (e.g., from automobiles), or to prohibit the pet from accessing certain items (e.g., flower beds, vegetable gardens, or the like), to separate the pet from other animals or people (e.g., other dogs, the mailman, visitors, etc.), or the like.

Various types of pet tethers have been developed for keeping pets within a desired area. Most prior art pet tethers include some type of stake which is secured into the ground and a leash attached to the stake, such as, for example, the tethers disclosed in U.S. Pat. No. 6,810,630 to Chizmas and U.S. Pat. No. 5,526,774 to Swindall, Jr., et al. Certain other prior art pet tethers include a retractable leash mechanism, such as those disclosed in U.S. Pat. No. 2,437,786 to Oberdorf, U.S. Pat. No. 3,123,052 to Marshall, and U.S. Pat. No. 6,523,500 to Zenteno.

However, the prior art pet tethers all have certain shortcomings. For example, prior art pet tethers which are secured into the ground using a stake having a straight shaft with a pointed end are easily pulled from the ground by pet. Other prior art pet tethers can easily become tangled as the pet circles around the stake. Further still, it is difficult to install most prior art pet tethers in hard ground.

It would be advantageous to provide a pet tether which overcomes the problems associated with the prior art. In particular, it would be advantageous to provide a pet tether with a retractable leash which rotates about the stake which secures it into the ground. It would be further advantageous to use a spiral stake to secure the pet tether into the ground. It would also be advantageous to provide a handle on the stake which provides sufficient leverage to enable the spiral stake to be secured into even very hard or rocky soil.

The present invention provides the foregoing and other advantages.

SUMMARY

The present invention relates to a rotatable and retractable pet tether having a spiral stake.

In an example embodiment of the present invention, a pet tether having a spiral stake is provided. A handle is attached to the spiral stake. A tether housing is rotatably mounted on the spiral stake. The tether housing has an opening therein. A tether line is disposed in the housing and adapted for deployment from the opening in the housing. Retraction means are arranged in the housing for retracting the tether line after deployment. Attachment means are connected to the tether line for attaching the tether line to a pet collar.

The handle may comprise a bar extending perpendicular to a vertical axis of the spiral stake and intersecting the spiral stake at a midpoint of the bar. The handle may be positioned below the tether housing.

The spiral stake may comprise a top section for receiving the tether housing, a middle section for receiving the handle, and a bottom section having a spiral shape and adapted to be driven downward into a substrate upon rotation of the handle. The bottom section may comprise a pointed end.

The attachment means may comprise a hook, a snap ring, or the like. The attachment means may be rotatably attached to the tether line.

A stop may be provided on the tether line which is adapted to prevent the tether line from completely retracting into the opening of the tether housing.

The tether housing may be rotatably mounted on the spiral stake via at least one set of bearings. For example, the tether housing may be rotatably mounted on the spiral stake via two sets of bearings. The two sets of bearings may be spaced apart from one another in the tether housing.

In a further example embodiment of the present invention, the retraction means may comprise a reel rotatably mounted on a shaft in the tether housing and adapted to receive the tether line. Spring means may be arranged around the shaft and adapted to rotate the reel on the shaft for the retracting of the tether line after deployment. The spring means may be connected at a first end to the reel and at a second end to the shaft. The second end of the spring means may be retained in a slot in the shaft. The spring means may comprise a coil spring. The spring means may be arranged in an inner recess provided on one side of the reel. A cover plate may be provided which is adapted to retain the spring means in the recess. The cover plate may be rotatably mounted on the shaft and may be removably attached to the reel.

In one example embodiment of the present invention, the shaft may be formed as part of the housing. The housing may comprise two housing sections. The shaft may be formed by at least one projection extending from at least one of the housing sections.

BRIEF DESCRIPTION OF THE DRAWINGS

The present invention will hereinafter be described in conjunction with the appended drawing figures, wherein like reference numerals denote like elements, and.

DETAILED DESCRIPTION

The ensuing detailed description provides exemplary embodiments only, and is not intended to limit the scope, applicability, or configuration of the invention. Rather, the ensuing detailed description of the exemplary embodiments will provide those skilled in the art with an enabling description for implementing an embodiment of the invention. It should be understood that various changes may be made in the function and arrangement of elements without departing from the spirit and scope of the invention as set forth in the appended claims.

Figure 1:
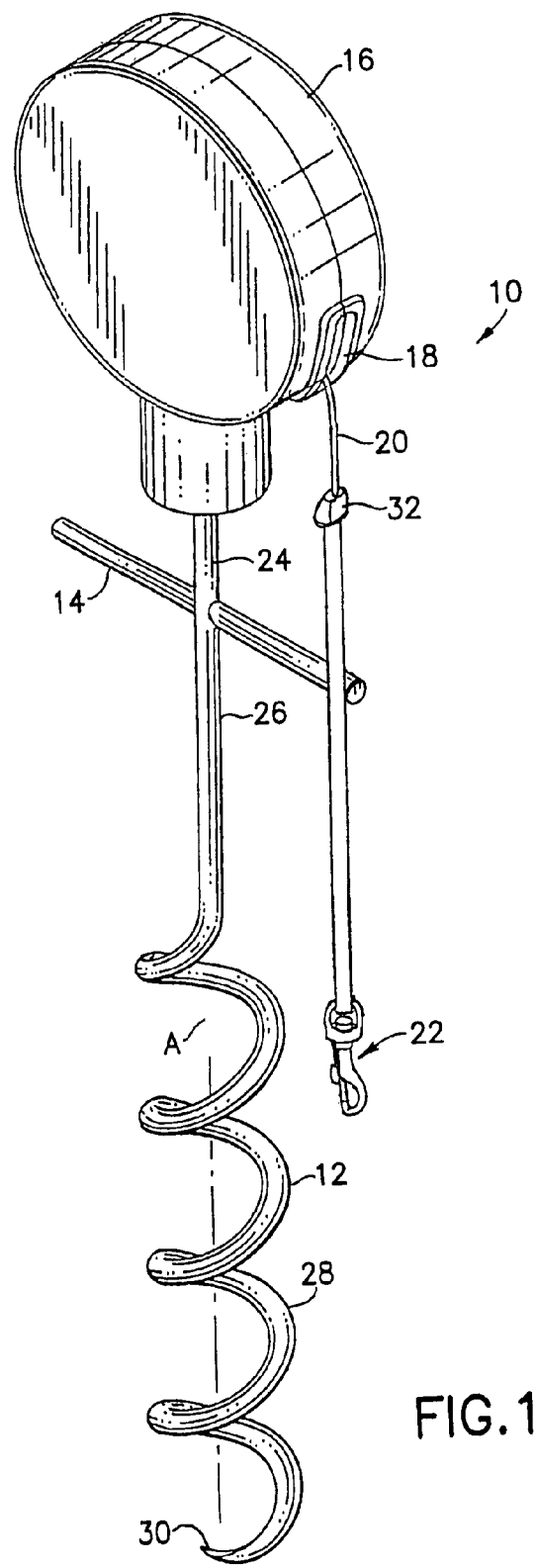
FIG. 1 shows a perspective view of an example embodiment of the present invention.
Figure 2:
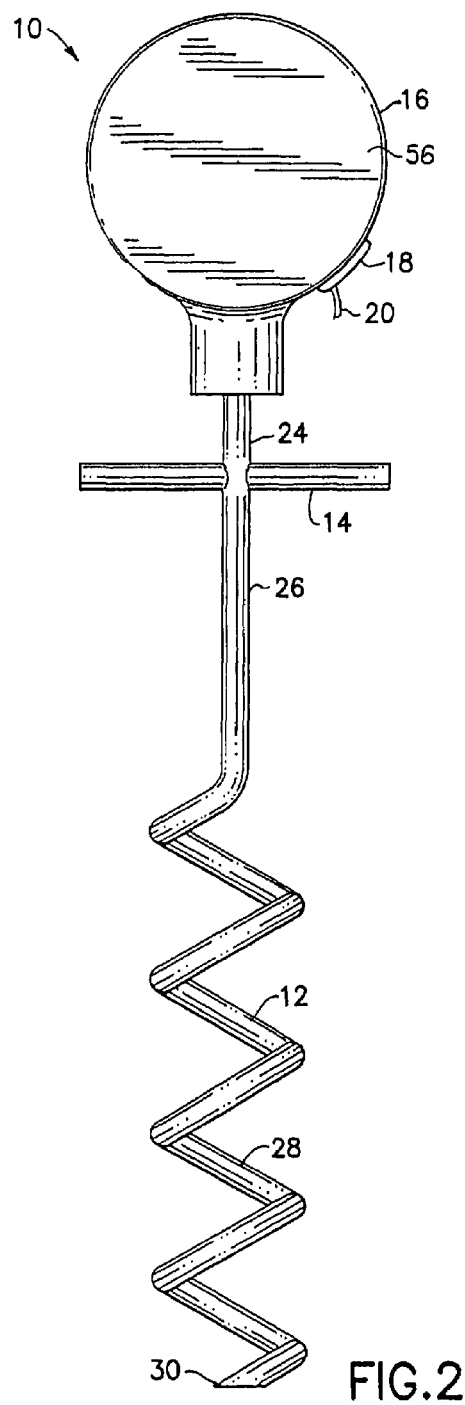
FIG. 2 shows a front view of the example embodiment of the present invention shown in FIG. 1.
Figure 3:
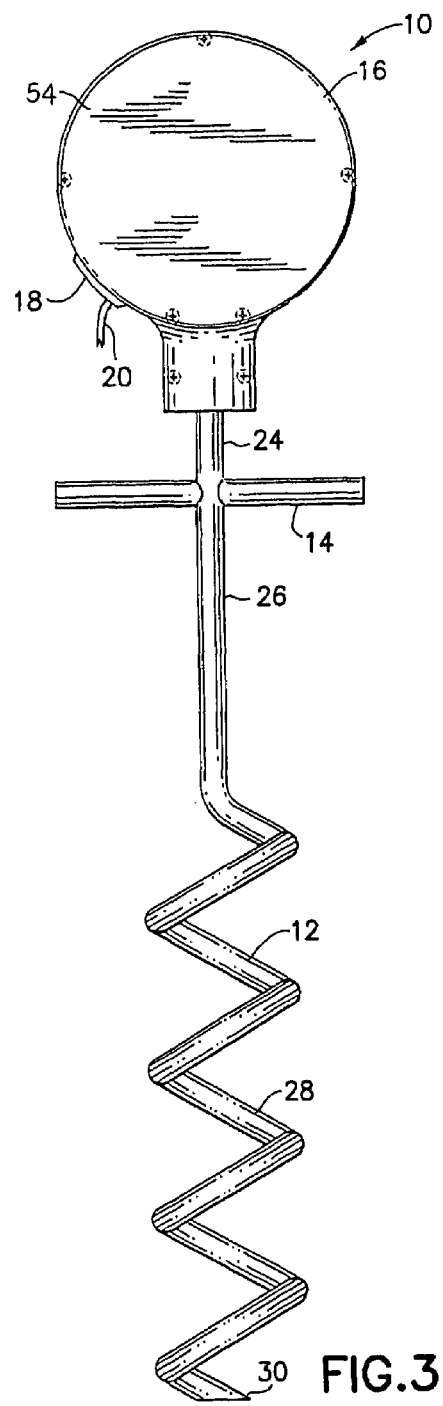
FIG. 3 shows a rear view of the example embodiment of the present invention shown in FIG. 1.

In an example embodiment of the present invention as shown in FIGS. 1-3, a pet tether 10 having a spiral stake 12 is provided. A handle 14 is attached to the spiral stake 12. A tether housing 16 is rotatably mounted on the spiral stake 12. The tether housing 16 has an opening 18 therein. A tether line 20 is disposed in the housing 16 and adapted for deployment from the opening 18 in the housing 16. Retraction means are arranged in the housing 16 for retracting the tether line 20 after deployment. The retraction means are described in detail below in connection with FIGS. 4 and 5. Attachment means 22 are connected to the tether line 20 for attaching the tether line 20 to a pet collar.

The handle 14 may comprise a bar extending perpendicular to a vertical axis A of the spiral stake 12 and intersecting the spiral stake 12 at a midpoint of the bar. The handle 14 may be positioned below the tether housing 16. The handle 14 may be of sufficient length to provide leverage to drive the spiral stake 12 into hard or rocky soil. The handle 14 may be integral to the stake 12 or fixed to stake 12 by appropriate means, such as welding, bolting, or the like.

The spiral stake 12 may comprise a top section 24 for receiving the tether housing 16, a middle section 26 for receiving the handle 14, and a bottom section 28 having a spiral shape and adapted to be driven downward into a substrate upon rotation of the handle 14. The bottom section 28 may comprise a pointed end 30 for penetrating the substrate when the handle 14 is rotated. It should be appreciated that although the figures show the handle 14 positioned below the tether housing 16 and configured as a straight bar, the handle 14 may be placed in various positions on the stake 12 and take other forms. Further, the handle 14 may be knurled or provided with textured rubber grips to prevent an operator's hand from slipping off.

The attachment means 22 may comprise a hook, a snap ring, or the like. The attachment means 22 may be rotatably attached to the tether line 20 by a variety of means known in the art.

A stop 32 may be provided on the tether line 20 which is adapted to prevent the tether line 20 from completely retracting into the opening 18 of the tether housing 16. For example, the stop 32 may comprise a rubber wedge or ball fixed around the tether line 20 a short distance from the attachment means 22 which is slightly larger than the opening 18 in the tether housing 16.

Figure 4:
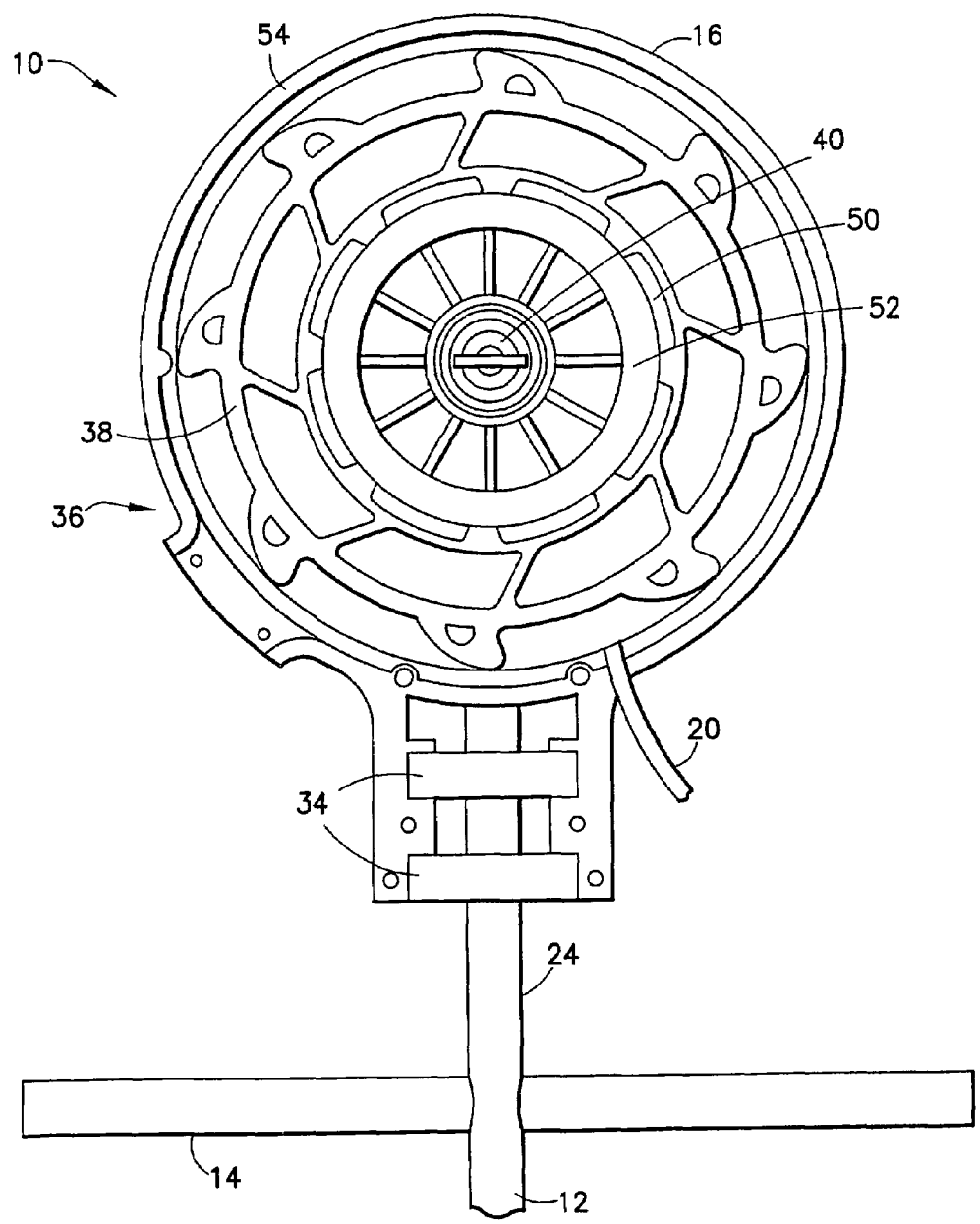
FIG. 4 shows a view of an interior of a housing in accordance with an example embodiment of the present invention.

As shown in the example embodiment of FIG. 4, the tether housing 16 may be rotatably mounted on the spiral stake 12 via at least one set of bearings 34. For example, the tether housing 16 may be rotatably mounted on the spiral stake 12 via two sets of bearings 34. The two sets of bearings 34 may be spaced apart from one another in the tether housing 16. In such an embodiment, the top section of the stake 24 penetrates into the housing and through said bearing sections 34. Such a design provides improved stability and durability and allows for rotation of the housing 16 about the spiral stake 12 even when large forces perpendicular to the axis A of the stake 12 are placed on the housing 16, for example by a pet straining against a fully extended tether line 20.

Figure 5:
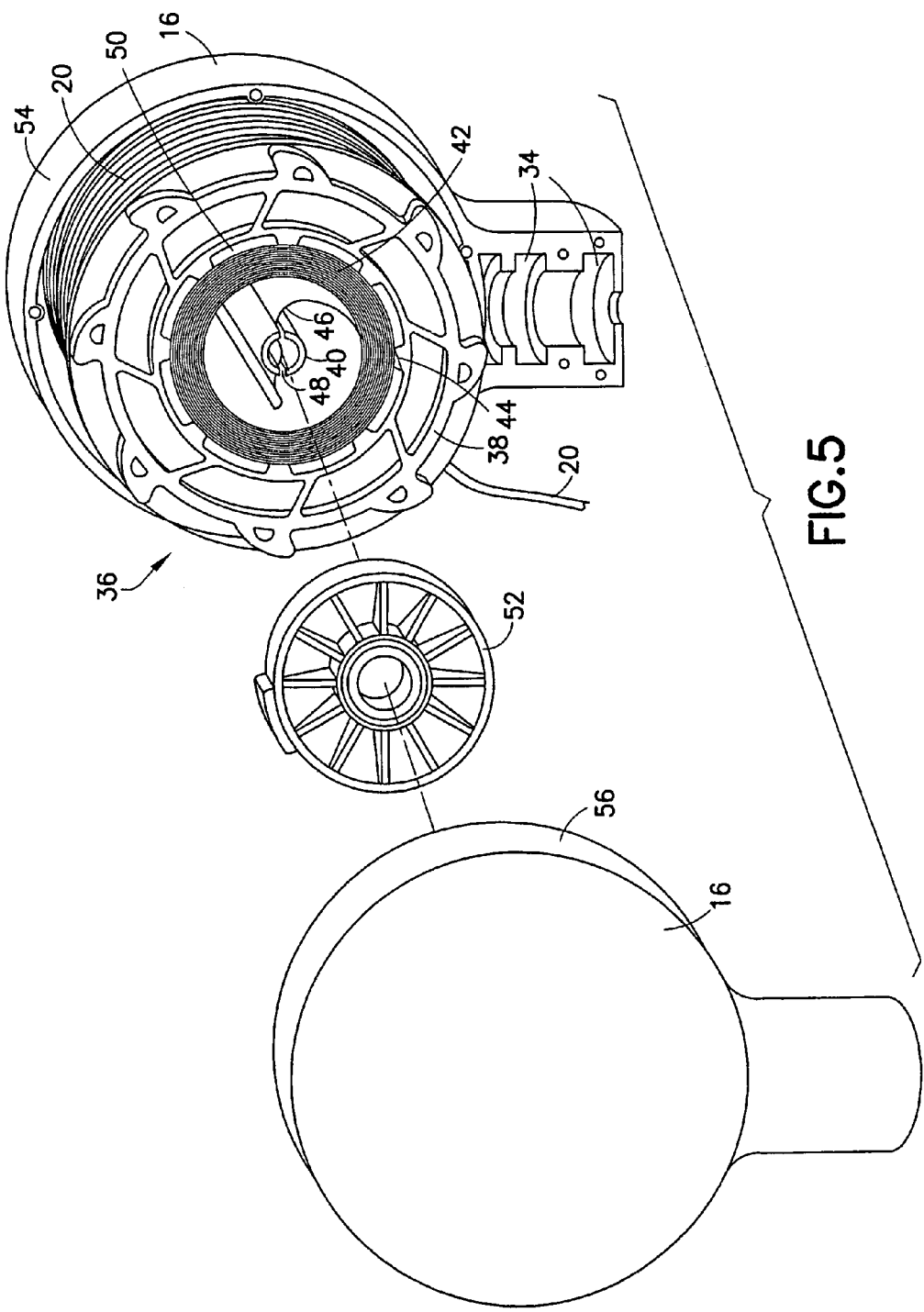
FIG. 5 shows an exploded view of an example embodiment of the housing of the present invention.

In one example embodiment of the present invention as shown in FIGS. 4 and 5, the retraction means 36 may comprise a reel 38 rotatably mounted on a shaft 40 in the tether housing 16 and adapted to receive the tether line 20. Spring means 42 may be arranged around the shaft 40 and adapted to rotate the reel 38 on the shaft 40 for the retracting of the tether line 20 after deployment. The spring means 42 may be connected at a first end 44 to the reel 38 and at a second end 46 to the shaft 40. The second end 46 of the spring means 42 may be retained in a slot 48 in the shaft 40. The spring means 42 may comprise a coil spring. The spring means 42 may be arranged in an inner recess 50 provided on one side of the reel 18. A cover plate 52 may be provided which is adapted to retain the spring means 42 in the recess 50. The cover plate 52 may be rotatably mounted on the shaft 40 and may be removably attached to the reel 38.

In one example embodiment of the present invention, the shaft 40 may be formed as part of the housing 16. The housing 16 may comprise two housing sections 54, 56. The shaft 40 may be formed by at least one projection extending from at least one of the housing sections (e.g., section 54 as shown in FIG. 5).

It should now be appreciated that the present invention provides an advantageous retractable and rotatable pet tether which is easy to secure into the ground and prevents entanglement of the tether line.

Although the invention has been described in connection with various illustrated embodiments, numerous modifications and adaptations may be made thereto without departing from the spirit and scope of the invention as set forth in the claims.

What is claimed is:

1. A pet tether, comprising:
    a spiral stake having a spiral portion for screwing said pet tether into ground and a straight portion for extending upwardly when the spiral portion is screwed into the ground;
    a handle attached to the straight portion of said spiral stake;
    a tether housing having two substantially circular end faces with a circumferential side wall therebetween, said end faces being spaced opposite one another along a common center axis to provide a substantially cylindrical interior cavity;
    a bearing chamber extending from the circumferential side wall for rotatably mounting the tether housing to the straight portion of said spiral stake, such that said tether housing extends from said straight portion with the center axis of said end faces perpendicular to a longitudinal axis of said straight portion;
    an opening in said tether housing, said opening disposed on the circumferential side wall of said tether housing at a point below the center axis of said end faces when said tether housing is mounted on said spiral stake;
    a tether line disposed in the interior cavity of said tether housing and adapted for deployment from said opening in said tether housing;
    retraction means arranged in the interior cavity of said tether housing for retracting said tether line after said deployment; and
    attachment means connected to said tether line for attaching said tether line to a pet collar.

2. A pet tether in accordance with claim 1, wherein:
    said handle comprises a bar extending perpendicular to said longitudinal axis of said straight portion and intersecting said spiral-stake straight portion at a midpoint of said bar.

3. A pet tether in accordance with claim 1, wherein:
    said handle is positioned below said tether housing.

4. A pet tether in accordance with claim 1, wherein said spiral stake comprises:
    a top section for receiving said tether housing;
    a middle section encompassing said straight portion for receiving said handle; and
    a bottom section encompassing said spiral portion and adapted to be driven downward into the ground upon rotation of said handle.

5. A pet tether in accordance with claim 4, wherein said bottom section comprises a pointed end.

6. A pet tether in accordance with claim 1, wherein said attachment means comprises one of a hook or a snap ring.

7. A pet tether in accordance with claim 1, wherein said attachment means is rotatably attached to said tether line.

8. A pet tether in accordance with claim 1, further comprising:
a stop disposed on said tether line adapted to prevent said tether line from completely retracting into said opening of said tether housing.

9. A pet tether in accordance with claim 1, wherein said tether housing is rotatably mounted on said spiral stake via at least one set of bearings.

10. A pet tether in accordance with claim 9, wherein said tether housing is rotatably mounted on said spiral stake via two sets of bearings.

11. A pet tether in accordance with claim 10, wherein the two sets of bearings are spaced apart from one another in said bearing chamber.

12. A pet tether in accordance with claim 1, wherein said retraction means comprises:
a reel rotatably mounted on a shaft in said tether housing and adapted to receive said tether line;
spring means arranged around said shaft and adapted to rotate said reel on said shaft for said retracting of said tether line after said deployment.

13. A pet tether in accordance with claim 12, wherein said spring means is connected at a first end to said reel and at a second end to said shaft.

14. A pet tether in accordance with claim 13, wherein said second end of said spring means is retained in a slot in said shaft.

15. A pet tether in accordance with claim 12, wherein said spring means comprises a coil spring.

16. A pet tether in accordance with claim 12, said spring means is arranged in an inner recess provided on one side of said reel.

17. A pet tether in accordance with claim 16, further comprising a cover plate adapted to retain said spring means in said inner recess.

18. A pet tether in accordance with claim 17, wherein:
said cover plate is rotatably mounted on said shaft and is removably attached to said reel.

19. A pet tether in accordance with claim 12, wherein said shaft is formed as part of said tether housing.

20. A pet tether in accordance with claim 19, wherein:
said tether housing comprises two housing sections; and
said shaft is formed by at least one projection extending from at least one of said housing sections.

* * * * *

UNITED STATES PATENT AND TRADEMARK OFFICE
CERTIFICATE OF CORRECTION

PATENT NO. : 7,673,588 B2  Page 1 of 1
APPLICATION NO. : 11/528013
DATED : March 9, 2010
INVENTOR(S) : David T. Head It is certified that error appears in the above-identified patent and that said Letters Patent is hereby corrected as shown below:

Column 4, line 49
   Delete the wording "spiral-stake"

Signed and Sealed this

Eighteenth Day of May, 2010

David J. Kappos
*Director of the United States Patent and Trademark Office*